United States Patent
Nakanishi

(10) Patent No.: US 8,320,691 B2
(45) Date of Patent: Nov. 27, 2012

(54) IMAGE CODING APPARATUS, IMAGE DECODING APPARATUS, AND IMAGE DECODING METHOD

(75) Inventor: Keiri Nakanishi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1025 days.

(21) Appl. No.: 11/860,823

(22) Filed: Sep. 25, 2007

(65) Prior Publication Data

US 2008/0080779 A1 Apr. 3, 2008

(30) Foreign Application Priority Data

Oct. 2, 2006 (JP) ................................ 2006-271167

(51) Int. Cl.
*G06K 9/36* (2006.01)
*G06K 9/46* (2006.01)

(52) U.S. Cl. ......................... 382/238; 382/236; 382/233

(58) Field of Classification Search .................. None
See application file for complete search history.

(56) References Cited

U.S. PATENT DOCUMENTS

| | | | | |
|---|---|---|---|---|
| 4,689,671 A * | 8/1987 | Ohki et al. | ................ | 375/240.13 |
| 4,941,193 A * | 7/1990 | Barnsley et al. | .............. | 382/249 |
| 5,177,608 A * | 1/1993 | Ohki et al. | .................. | 348/416.1 |
| 5,592,228 A | 1/1997 | Dachiku et al. | | |
| 5,751,362 A | 5/1998 | Lee | | |
| 6,052,414 A * | 4/2000 | Lee et al. | .................. | 375/240.16 |
| 6,301,301 B1 * | 10/2001 | Isu et al. | .................. | 375/240.14 |
| 6,335,985 B1 * | 1/2002 | Sambonsugi et al. | ........ | 382/190 |
| 6,774,908 B2 * | 8/2004 | Bates et al. | .................... | 345/589 |
| 7,292,633 B2 * | 11/2007 | Chujoh et al. | ........... | 375/240.08 |
| 7,612,909 B2 * | 11/2009 | Kondo et al. | .................. | 358/1.9 |
| 2005/0232606 A1 * | 10/2005 | Hosoda et al. | ................. | 386/111 |
| 2007/0147690 A1 * | 6/2007 | Ishiwata | ........................ | 382/232 |
| 2008/0123747 A1 * | 5/2008 | Lee et al. | .................. | 375/240.16 |
| 2008/0317289 A1 * | 12/2008 | Oyaizu | ........................ | 382/107 |
| 2009/0002517 A1 * | 1/2009 | Yokomitsu et al. | ........ | 348/223.1 |

FOREIGN PATENT DOCUMENTS

| | | |
|---|---|---|
| JP | 62-12286 | 1/1987 |
| JP | 62-12287 | 1/1987 |
| JP | 7-264597 | 10/1995 |

(Continued)

OTHER PUBLICATIONS

Mukawa, N.; Kuroda, H.; "Uncovered Background Prediction in Interframe Coding", IEEE Transactions on Communications, vol. 33, 1985, pp. 1227-1231.*

(Continued)

*Primary Examiner* — Li Liu
(74) *Attorney, Agent, or Firm* — Oblon, Spivak, McClelland, Maier & Neustadt, L.L.P.

(57) ABSTRACT

An image coding apparatus includes a particular region detecting unit configured to detect from an input picture a particular region including a particular picture, the particular region detected as a region within the input picture which has a hue within a predetermined range corresponding to an average hue of the particular picture and which has an amount of movement between different frames which is equal to or larger than a threshold. A coding unit generates a coded stream by performing coding processing that is intra-frame coding or interframe coding on the input picture, and performs with respect to the particular region a processing of embedding initial conditions into the coded stream, instead of performing the interframe coding.

8 Claims, 8 Drawing Sheets

FOREIGN PATENT DOCUMENTS

| | | |
|---|---|---|
| JP | 11-308623 | 11/1999 |
| JP | 2003-288603 | 10/2003 |
| JP | 2004-334694 | 11/2004 |

OTHER PUBLICATIONS

Hepper, D.; "Efficiency analysis and application of uncovered background prediction in a low bit rate image coder", IEEE Transactions on Communications, vol. 38,1990, pp. 1578-1584.*

Kaup, A.; Aach, T.; "Efficient prediction of uncovered background in interframe coding using spatial extrapolation", IEEE International Conference on Acoustics, Speech, and Signal Processing, 1994. ICASSP-94., pp. V/501-V/504 vol. 5.*

Amoroso, C.; Ardizzone, E.; Morreale, V.; Storniolo, P.; "A new technique for color image segmentation", Proceedings of International Conference on Image Analysis and Processing, 1999, pp. 352-357.*

Bertalmio, M.; Bertozzi, A.L.; Sapiro, G.; "Navier-stokes, fluid dynamics, and image and video inpainting", IEEE Computer Society Conference on Computer Vision and Pattern Recognition, 2001. pp. I-355-1-362 vol. 1.*

Japanese Office Action issued Nov. 30, 2010, in Patent Application No. 2006-271167.

Office Action issued Nov. 8, 2011 in Japan Application No. 2006-271167.

* cited by examiner

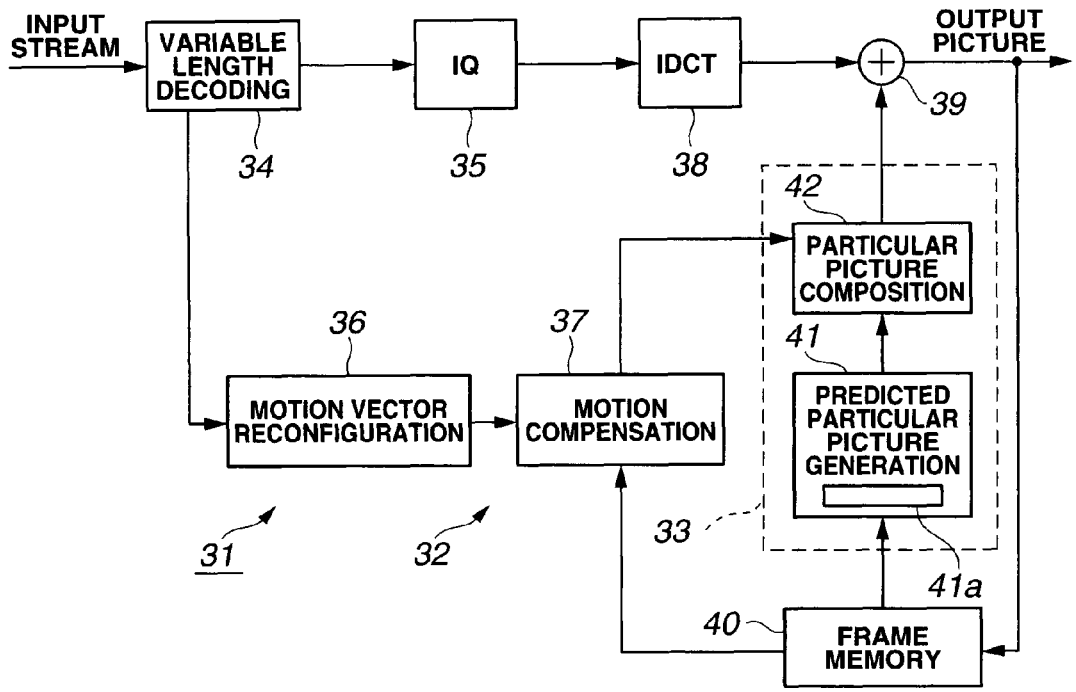
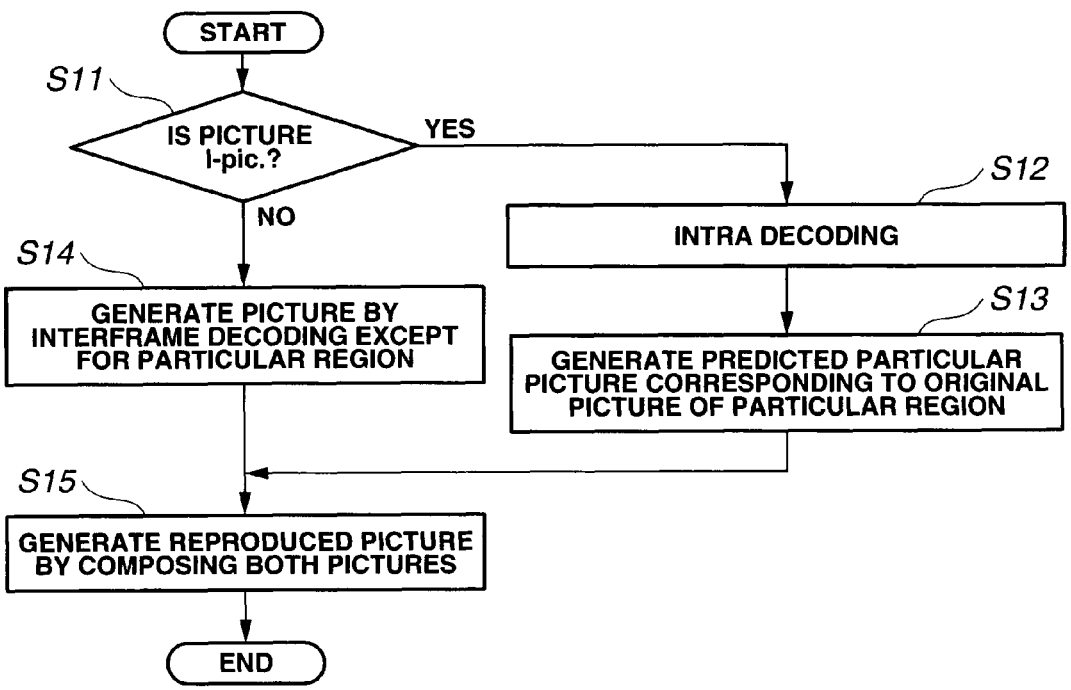

IMAGE CODING APPARATUS, IMAGE DECODING APPARATUS, AND IMAGE DECODING METHOD

CROSS-REFERENCE TO RELATED APPLICATION

This application is based upon and claims the benefit of priority from prior Japanese Patent Application No. 2006-271167 filed on Oct. 2, 2006; the entire contents of which are incorporated herein by reference.

BACKGROUND OF THE INVENTION

1. Field of the Invention

The present invention relates to an image coding apparatus, an image decoding apparatus, and an image decoding method for an image to be subjected to interframe coding.

2. Description of the Related Art

An image coding apparatus that uses a coding unit configured to perform interframe coding with motion compensation such as MPEG and the like on chronological ordered pictures forming an image to reduce the amount of picture data of a motion picture smaller than that in the case where interframe coding is not used, and the image decoding apparatus that decodes coded image or a picture have been widely in use recently.

When a picture including a particular region with great change with time such as the region including smoke, flare or the like, i.e., a particular region with a big amount of movement or a big amount of shift in a corresponding picture between different frames is to be coded, a conventional image coding apparatus is likely to have a big prediction error in the interframe coding.

Such a case with a big prediction error can be addressed by inserting many intra-pictures (abbreviated as I-picture) that are to be coded in respective intra-frames. A problem is still left in that the amount of coding is increased.

Japanese Patent Laid Open No. 2004-30225 discloses an apparatus for detecting smoky region.

However, with the apparatus disclosed in Japanese Patent Laid Open No. 2004-30225, no unit configured to perform coding or decoding is disclosed.

SUMMARY OF THE INVENTION

An image coding apparatus according to an embodiment of the present invention includes:

a particular region detecting unit configured to detect a particular region whose hue is within a predetermined range and whose amount of movement or amount of shift between different frames is a threshold or more from chronologically input pictures forming an image; and a coding unit configured to perform coding on a picture in a frame in which the particular region detected by the particular region detecting unit is replaced by a predetermined picture other than the particular region, while detecting a motion vector between the frames.

An image decoding apparatus according to an embodiment of the present invention includes:

a decoding unit configured to decode between frames for a picture part other than a particular region whose hue in a series of pictures forming an image is within a predetermined range and whose amount of movement or amount of shift between different frames is a threshold or more in a coded picture of an interframe coded frame in which the particular region is replaced by a predetermined picture; and a simulation picture generating unit configured to generate a simulation picture corresponding to an original picture in the particular region in the coded picture by simulation using a particular picture corresponding to the particular region in an intra-frame coded frame.

An image decoding method according to an embodiment of the present invention includes:

decoding between frames for a picture part other than a particular region whose hue in a series of pictures forming an image is within a predetermined range and whose amount of movement or amount of shift between different frames is a threshold or more in a coded picture of an interframe coded frame in which the particular region is replaced by a predetermined picture; and generating a simulation picture corresponding to an original picture in the particular region in the coded picture by simulation using a particular picture corresponding to the particular region in an intra-frame coded frame.

BRIEF DESCRIPTION OF THE DRAWINGS

FIG. 4 is a block diagram showing a configuration of an image decoding apparatus according to a second embodiment of the present invention;

FIG. 6 is a flowchart showing outlined operations of the image decoding apparatus according to the second embodiment;

DETAILED DESCRIPTION OF THE EMBODIMENTS OF THE INVENTION

Embodiments of the present invention will be described with reference to the drawings.

First Embodiment

Figure 1:
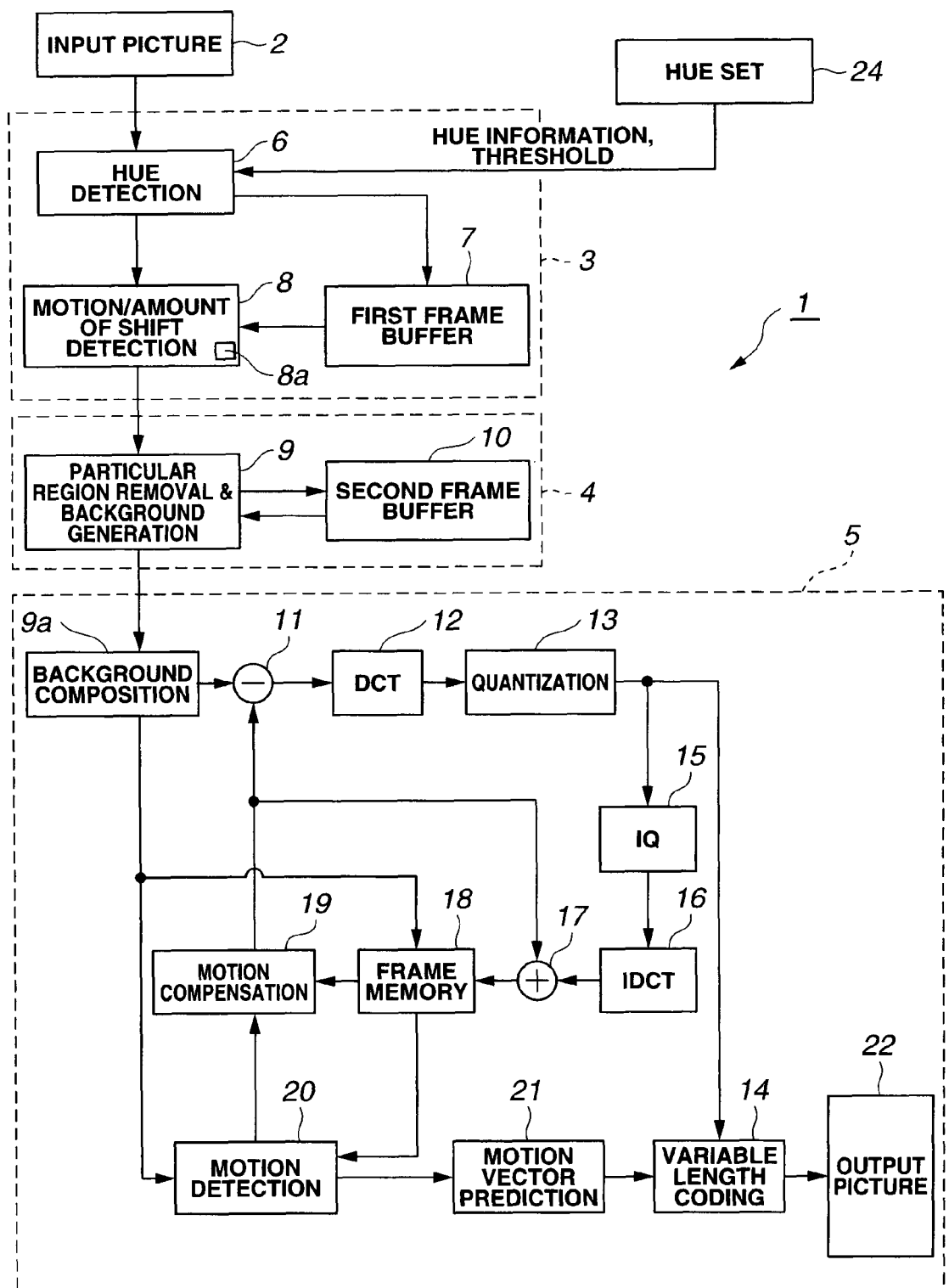
FIG. 1 is a block diagram showing a configuration of an image coding apparatus according to a first embodiment of the present invention.

FIG. 1 shows a configuration of an image coding apparatus 1 according to a first embodiment of the present invention. The image coding apparatus 1 includes a particular region detecting unit 3 configured to detect a particular region with a big movement or a big change with time such as a region including smoke, flare or the like from an input picture 2 to be input.

That is, if interframe coding with motion detection is performed on a particular region with a big movement or a big change with time such as a region including smoke, flare or the like, a predicted error or the amount of interframe coding increases.

Therefore, the present embodiment is adapted to detect a particular region with such a property so as not to perform the interframe coding on the particular region as it is.

A picture of a frame including the particular region detected by the particular region detecting unit 3 is input to the background composing unit 4.

The background composing unit 4 removes picture data of the particular region part in a picture other than an intra-picture (abbreviated as I-picture), and generates a background composed picture (or a replaced picture) by replacing the particular region part with a background picture or the like that can further reduce the prediction error.

The I-picture is a picture (frame) on which coding is performed in a frame. The picture other than the I-picture, i.e., the picture of inter-picture is subjected to the interframe coding.

The background composed picture output from the background composing unit 4 is divided into blocks made of the predetermined number of pixels (Macro Block or the like) and input into a picture coding unit 5. The picture coding unit 5 codes each block of the input background composed pictures and generates an output picture 22. The picture coding unit 5 corresponds to a picture coding apparatus that has been generally used.

The background composing unit 4 generates information on the particular region part for a frame of the I-picture (the information is used in decoding an image), but outputs the blocks divided from the input picture to the picture coding unit 5.

Then, at the side of an image decoding apparatus 31 to be described later in the second embodiment or the like, processing for decoding a particular region having a property of smoke, flare or the like will be performed on a coded picture output from the image coding apparatus 1, more particularly on a particular region part replaced with the background picture or the like by using information on the particular region part in the I-picture in a case of a frame other than the I-picture. The particular region detecting unit 3 has a hue detecting circuit 6 configured to detect whether or not the input picture 2 is a region corresponding to a particular region whose hue matches that of smoke or the like, a first frame buffer 7 configured to store a frame including the region detected by the hue detecting circuit 6, and motion/shift amount detecting circuit 8 configured to detect motion or the amount of shift between pictures from a picture between frames.

The color detecting circuit 6 resolves a color picture, which makes an input picture, into R, G, B components, for example. Then, the color detecting circuit 6 detects whether or not the separated RGB picture components are within a hue range whose properties include smoke or the like by comparing the components with the threshold of the hue (or hue information).

The information on the hue detected by the hue-detecting circuit 6 can be set by a user from a detection hue setting circuit 23. The detection hue setting circuit 23 may be configured for a user to set by inputting from a keyboard or the like particular hue information corresponding to each hue of smoke, flare or the like to be detected.

In the present embodiment, the hue detecting circuit 6 performs hue detection by using at least two or more pieces of particular hue information corresponding to hues of smoke and flare.

The color detecting circuit 6 may have a function of setting such particular hue information to be detected instead of having the detection hue setting circuit 23 outside. The hue information may be hue information including a threshold.

For example, as particular hue information, a threshold taking account of an allowable range set from the standard hue as well as information on standard hue corresponding to each of smoke or flare to be detected.

As the color detecting circuit 6 compares a hue component of a frame with the threshold, if it is determined that it is a candidate region with possibility of a particular region within a hue range included in a particular picture part such as smoke, (the picture of) the frame is stored in the first frame buffer 7 and the hue detecting circuit 6 performs the same detection on the next frame.

Then, the motion/shift amount detecting circuit 8 detects (determines) whether or not the amount of motion or the amount of shift between both candidate regions exceeds the threshold by calculating the amount of motion due to the amount of shift between center positions of corresponding both candidate regions or the sum of two squares of differences of corresponding both pixel values (integrated value of squares) or the like, for example for the both candidate regions determined to match within the threshold by the hue detection between the adjacent frames.

The motion/shift amount detecting circuit 8 has a threshold setting circuit 8a for a user to set the threshold.

The motion/shift amount detecting circuit 8 detects (determines) whether or not the amount of motion or the amount of shift between the both candidate regions exceeds the threshold to determine whether or not the candidate regions are particular regions with the predicted error in the interframe coding as a main property of a particular picture such as smoke, flare or the like increased (therefore, the amount of coding increased).

The motion/shift amount detecting circuit 8 may also be configured to determine whether or not the candidate regions are particular regions corresponding to a particular picture based on whether or not the value of motion vector exceeds the threshold by detecting the value of motion vector between the both candidate regions instead of calculating the sum of squares.

Then, the next background composing unit 4 replaces the particular region part on which such determination is performed with a background picture or the like other than the particular region.

The particular region detecting unit 3 also has a method for examining the density to enhance detection accuracy on whether or not it is a particular region as well as the hue detection and the motion/shift amount detection. Specifically, the particular region detecting unit 3 can determine whether or not it is a particular region included in a particular picture part such as smoke by obtaining a variance matrix on a brightness value and a color difference for a certain block and counting the number of components within the threshold.

The background composing unit 4 has a particular region removing and background generating circuit 9 configured to remove a particular region in a picture that comes through the particular region detecting unit 3, and a second frame buffer 10 configured to store a frame picture part left after a particular region is removed by the particular region removing and background generating circuit 9.

The particular region removing and background generating circuit 9 generates a background composed picture by reading from the second frame buffer 10 the frame picture part left after the particular region is removed and replacing the particular region part with a background picture or the like, divides the background composed picture into a plurality of blocks, and outputs each block (described as a background composition 9a in FIG. 1) to the picture coding unit 5.

As mentioned above, the background composing unit 4 divides the I-picture for which no interframe coding is performed, i.e., on which no motion vector detection is performed (referred to as I-picture), into a plurality of blocks and outputs each block to the picture coding unit 5 without replacing the particular region part in the input picture 2 with the background picture or the like.

When the particular region removing and background generating circuit 9 detects a particular region part, it outputs information on the region part to the picture coding unit 5. Then, the output picture 22 coded by the picture coding unit 5 includes the information. When a picture in a frame other than the I-picture is decoded from the output picture 22, the information is used for generating a picture (specifically, a simulation picture in the second embodiment to be described later) corresponding to an original picture of the particular region part.

Outline of the procedure for the particular region removing and background generating circuit 9 forming the background composing unit 4 to embed (replace) a particular region whose predicted error is big with a predetermined picture such as a background picture or the like at least other than the particular region will be shown below.

(a) Search a frame that includes a background instead of a particular region of smoke or the like whose predicted error becomes too big from pictures of several frames before and after the I-picture.

(b) Then, adopt a block at the same place as that of the block including a particular region in concern as a block of the background picture.

(c) If a block before or after a certain frame includes a background, the block may be adopted as a block of a background picture after subjected to motion compensation.

Alternatively, the block including the particular region may be embedded with an average hue of the particular region instead of being embedded with the above-mentioned background picture. That is, in a case where the particular region is smoke, for example, a processing in which the particular region is embedded with a white block as an average hue value of smoke may be applied. That is, the particular region may be replaced with a predetermined picture such as a background picture, a replaced picture or the like.

If a block including a particular region is replaced with a white block or the like as mentioned above, it may be replaced with a bock in which values for all the pixels forming the block are the same.

Figure 2:
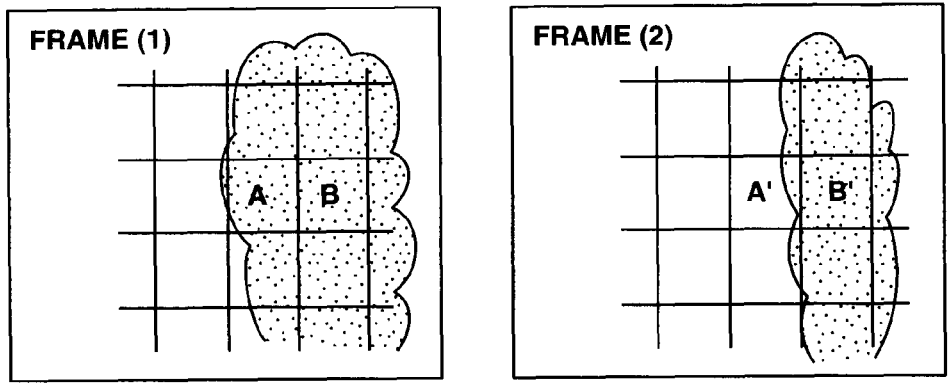
FIG. 2 is a diagram illustrating operations of interpolating a particular region with a background picture by a background composing unit.

A method for replacing a particular region for which a predicted error becomes big, such as smoke with a background picture will be further elaborated. FIG. 2 shows the frame next to the I-picture (the frame other than the I-picture) (1) and the frame after the next (2). Here, a particular region is smoke. As shown in the upper side of FIG. 2, smoke block A is a particular region in the frame (1) in concern before and after (here, after) the I-picture. In such a case, if a block A' that is at the same position as that of the block A in the other frame (2) is not smoke region in the frame (2), it is adopted as a background picture.

If a block B' in the other frame (2) is also totally covered with smoke like a block B, a frame including a background instead of smoke is searched for from several frames before and after the frame as mentioned above. If background blocks in the frame have motion vectors, motion compensation is performed.

If most part is covered with smoke as in a smoke block A with the other small parts of several pixels appearing like a background, the background is compensated with the nearest pixel with the shortest distance among pixels including the background. A monotone block, which has an average of pixel values of surrounding blocks as a pixel value, is set to a background picture without searching for a background picture for a block having all pixels white covered with only smoke regardless of time change in a series of frames having pictures of smoke.

In such a case, several frames between the two adjacent I-pictures only need to be considered. In the above-mentioned manner, a background composed picture without smoke or the like is generated for a frame other than the I-picture and its blocks are input in the picture coding unit 5.

The picture coding unit 5 performs picture coding by usual interframe coding on a background composed picture in which a particular region part is replaced with a background picture or the like, instead of detecting a motion vector for an original particular picture part with smoke or the like on a block of such a frame.

Accordingly, the present embodiment can avoid an incidence where the amount of predicted error difference in the case where an original picture including smoke or the like are subjected to the interframe coding increases to lead the bigger amount of interframe coding.

The picture coding unit 5 includes a subtractor 11 configured to perform subtraction on a block of the input background composed picture, a DCT circuit 12 configured to perform discrete cosine transform (abbreviated as DCT) on the output signal from the subtractor 11, and a quantizing circuit 13 configured to quantize the output signal from the DCT circuit 12 and output the quantized signal.

For the frame of the I-picture, the blocks of the I-picture instead of the background composed picture are let through the subtractor 11 and input in the DCT circuit 12.

The picture coding unit 5 includes a variable-length coding circuit 14 for separating the DCT coefficient or the motion vector to be described later for the input block into variable-length coded packets and outputting the output picture of bit stream signals.

The picture coding unit 5 includes an inverse quantizing circuit (abbreviated as IQ in FIG. 1) 15 configured to perform inverse quantization on the DCT coefficient output from the quantizing circuit 13, and an inverse DCT circuit (abbreviated as IDCT in FIG. 1) 16 configured to further perform an inverse discrete cosine transform on the inverse-quantized DCT coefficient.

The picture coding unit 5 includes an adder 17 configured to add an inverse discrete cosine transformed picture, a frame memory 18 configured to store output from the adder 17, and a motion compensating circuit (or a predicted picture creating circuit) 19 in which the picture stored in the frame memory 18 is input and configured to create a predicted picture subjected to motion compensation. The background composed picture is also input into the frame memory 18.

The predicted picture created by the motion compensating circuit 19 is output to the subtractor 11 and the adder 17.

The picture coding unit 5 includes a motion detecting circuit 20 configured to perform motion detection by using (blocks of) the background composed picture to be input and a picture stored in the frame memory 18 as a reference picture, and a motion vector predicting circuit 21 configured to predict a motion vector, which is a signal indicating motion toward a block to be output, in response to input of the motion vector of a block to be output from the motion detecting circuit 20.

When the picture to be input in the picture coding unit 5 with such configuration is the I-picture, the picture coding unit 5 only performs the intra-coding (intra-frame coding) on the I-picture. After the intra-coding, the intra-coded output picture 22 is output from the variable-length coding unit 14.

In contrast, when the picture is other than the I-picture, block matching is performed on the block of the background composed image to be input next with a block of the reference picture by using the picture stored in the frame memory 18 as the reference picture. Then, the picture coding unit 5 detects a motion vector from the block of the reference image and also creates the motion compensated predicted picture to code picture data of the predicted error which is the predicted picture subtracted from the background composed picture to be input.

That is, the picture coding unit 5 performs the interframe coding on a (inter-)frame other than the I-picture. In such a case, as a particular region such as smoke whose predicted error becomes big is replaced with background pictures around as mentioned above, the picture coding unit 5 can perform the interframe coding without making big predicted error.

Therefore, as a result of coding the motion picture (image) with the image coding apparatus 1, each particular region including smoke or the like is replaced with a predetermined picture such as a background picture or the like which can reduce the predicted error in each frame other than the I-picture in the motion picture, the interframe coding can be performed with the small amount of data.

Figure 3:
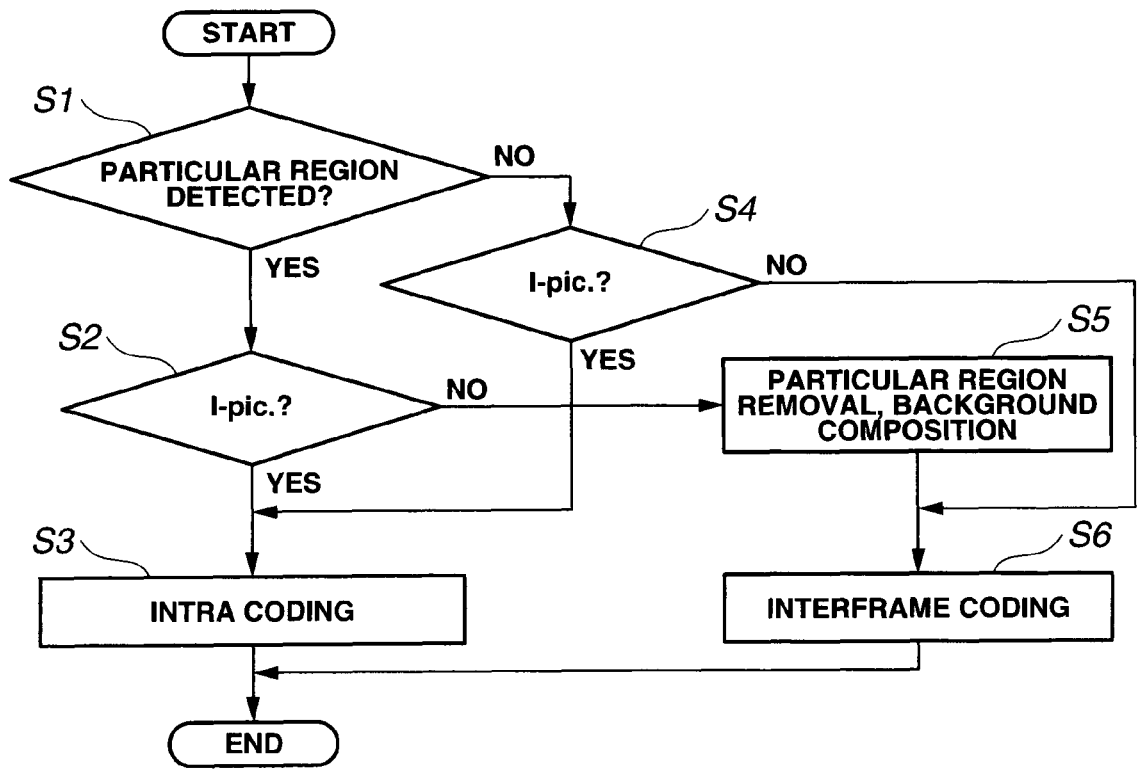
FIG. 3 is a flowchart showing operations of the image coding apparatus according to the first embodiment.

Outlined operations of the image coding apparatus 1 according to the present embodiment is shown in FIG. 3. The input picture 2 is input into the image coding apparatus 1, and the particular region detecting unit 3 detects a particular region from the input picture 2 at step S1.

If a particular region is detected, the particular region detecting unit 3 determines whether or not the input picture 2 is the I-picture (i.e., determines whether or not the input picture 2 is to be coded as the I-picture), for example, at the next step S2. Then, if the input picture 2 is the I-picture, the I-picture is sent to the picture coding unit 5 where the picture is subjected to the intra-coding as the I-picture at the next step S3.

On the other hand, even if a particular region is not detected at step S1, it is determined whether or not the input picture 2 is the I-picture at step S4. If the input picture 2 is the I-picture, the operation proceeds to step S3, where the intra-coding is performed on the I-picture.

If it is determined that the input picture 2 is not the I-picture at step S2, the operation proceeds to step S5, where the particular region removing and background composing unit 4 generates a background composed picture by removing the particular region and replacing it with a background picture. Then at the next step S6, the picture coding unit 5 performs the interframe coding on a background composed picture other than the I-picture.

Even if it is determined that the input picture 2 is not the I-picture at step S4, the interframe coding is also performed at step S6.

The present embodiment operating in such a manner causes the particular region detecting unit 3 to detect whether or not the particular picture 2 includes a particular region with big amount of motion or shift such as a region including smoke or the like and with the increased predicted error, and if such a particular region is not detected, it performs usual coding processing.

In contrast, if the particular region is detected, the interframe coding is performed by replacing the particular region with a background picture or the like for a frame other than the I-picture.

Therefore, the present embodiment can perform coding with a small amount of coding on an image including a particular region such as smoke with a big amount of motion or big amount of shift.

Second Embodiment

Now, the second embodiment of the present invention will be described. FIG. 4 shows a configuration of an image decoding apparatus 31 according to the second embodiment of the present invention.

The image decoding apparatus 31 performs decoding processing in response to input of a stream signal of the output picture 22 coded by the image coding apparatus 1 according to the first embodiment. Here, the image decoding apparatus 31 decodes (reproduces) a particular region in a frame other than the I-picture by using picture information of the particular region covered with smoke or the like in the frame of the first I-picture and information on the particular region.

For that purpose, the image decoding apparatus 31 includes a second image-decoding unit 33 configured to perform the image decoding on the particular region in a first image-decoding unit 32 configured to perform usual image decoding.

The stream signal is input into the variable-length decoding circuit 34 forming the first image-decoding unit 32.

First, the coded stream signal in the frame of the I-picture is input into the variable-length decoding circuit 34, where the variable-length code in the stream signal is returned to a fixed-length code and output to an inverse quantizing circuit 35.

Similarly, for the frame other than the I-picture following to the I-picture, the variable-length decoding circuit 34 returns the variable-length code to the fixed-length code and outputs it to the inverse quantizing circuit 35. The variable-length decoding circuit 34 also extracts the data part of the coded motion vector in the stream signal and outputs it to a motion vector reconfiguring circuit 36.

The motion vector reconfiguring circuit 36 calculates from the input coded motion vector the position information of the motion vector to be referred to in the motion compensation processing. Then, the motion vector reconfiguring circuit 36 sends the calculated position information of the motion vector to a motion compensating circuit 37. The motion compensation circuit 37 generates a motion compensated predicted picture by using the position information of the motion vector.

The inverse quantizing circuit 35 generates a reproduced DCT coefficient value of the predicted remainder from the fixed-length code and outputs it to an inverse DCT circuit 38. The inverse DCT circuit converts for example, eight by eight coefficients into a reproduced predicted remainder picture and outputs it to an adder 39.

When the predicted picture output from the motion compensating circuit 37 is input through the second image-decoding unit 33, the adder 39 adds the predicted picture to the reproduced predicted remainder picture to generate the reproduced picture. In the case of the I-picture, it generates the reproduced picture without performing motion compensation.

In the case of the picture part removed of the particular region, the second image-decoding unit 33 outputs the predicted picture output from the motion compensating circuit 37 to the adder 39. On the other hand, in the case of the predicted region, it outputs the predicted particular picture generated at the second image-decoding unit 33 to the adder 39 and embeds the predicted particular picture to the particular region so as to generate the reproduced picture in which the particular region is replaced with the predicted particular picture.

The reproduced picture is output from an output terminal as an output picture, and sent to the frame memory 40 to be stored therein as a reference picture in motion compensation.

The picture stored in the frame memory 40 is output to the motion compensating circuit 37, where motion compensation is performed based on the position information of the motion vector obtained from the motion vector reconfiguring circuit 36 by using the picture stored in the frame memory 40 as the reference picture and generates the predicted picture. The obtained predicted picture is output to the adder 39 to be used in generating of the reproduced picture of the next frame.

In the present embodiment, the second image-decoding unit 33 performs generation of a reproduced picture by generating a predicted picture corresponding to a particular region part in the frame other than the I-picture (hereinafter, refereed to as a predicted particular picture) by using the particular picture part (particular region) such as a part covered with smoke or the like in the first I-picture stored in the frame memory 40, and replacing the particular region part with the predicted particular picture.

For this purpose, the second image-decoding unit 33 includes a predicted particular picture generating circuit 41 configured to generate a predicted particular picture corresponding to smoke or the like that makes an original picture by using the first I-picture until the next I-picture appears, and a particular picture composing circuit 42 configured to decode the predicted particular picture generated by the predicted particular picture generating circuit 41 as a picture in the particular region (particular picture) by performing such processing as embedding the predicted particular picture into a particular region in the frame other than the I-picture.

The predicted particular picture generating circuit 41 has a simulation picture generating circuit 41a configured to generate a simulation picture by simulation as a predicted particular picture in the present embodiment.

For the purpose of generating a predicted particular picture by a simulation picture, the Navier-Stokes equation as shown below is used in the present embodiment. The procedure up to generate a predicted particular picture corresponding to the original picture in the particular region in the frame other than the I-picture will be outlined below.

(a) Decode each coded frame.

(b) Apply a velocity vector and a pressure (and an external force if required) to each position of a particular picture such as a picture covered with smoke or the like in the first I-picture frame as initial conditions.

(c) Under the initial conditions, generate the next frame by predicting the position in the next frame by solving the discrete two-dimensional Navier-Stokes equation, embedding the predicted particular picture into the particular region and combining them.

(d) Generate the frame after the next by adopting the predicted particular picture as a picture predicting the next frame, and performing the processing at (c) by using the velocity vector and the pressure as the initial conditions.

(e) Generate the predicted particular picture for the particular region in each frame between the I-pictures by repeating the operations of (c) and (d) until the next I-picture appears.

At the procedure (c), the processing of generating a particular picture by embedding a predicted particular picture into the particular region may be collectively performed at the end. The method of performing the processing at the end will be described below.

The procedure will be described below.

As described in the first embodiment, the particular region corresponding to the original particular picture part such as a part covered with smoke or the like is replaced with another picture (also referred to as a predetermined picture) in the frame other than the I-picture. Therefore, information on motion of the original picture is not included in the decoded information.

Then, the motion of the original picture part such as removed smoke or the like is made the predicted particular picture by the simulation picture generated by simulation.

If the original picture part is smoke, for example, the smoke is considered as a fluid and the two-dimensional Navier-Stokes equation [Formula 1] that describes behavior of the fluid is adopted in the present embodiment.

The motion of the smoke is calculated as the two-dimensional Navier-Stokes equation is approximately solved as the equation is divided into x and y components [Formula 2] and the components are discretized to make a difference equation [Formula 3].

[Formula 1]

$$(\partial/\partial t + (w \cdot \nabla))w = \nu \cdot \nabla^2 w - \nabla p - f(t,x,y) \qquad (1\text{-}1)$$

$$\nabla w = 0 \qquad (1\text{-}2)$$

where, $\nabla^2 = \partial^2/\partial x^2 + \partial^2/\partial y^2$, x=w(u, v)

[Formula 2]

$$(\partial/\partial t + u\partial/\partial x + v\partial/\partial y)u = \nu \cdot \nabla^2 u - \partial p/\partial x - f_x(t,x) \qquad (2\text{-}1)$$

$$(\partial/\partial t + u\partial/\partial x + v\partial/\partial y)v = \nu \cdot \nabla^2 v - \partial p/\partial y - f_y(t,y) \qquad (2\text{-}2)$$

[Formula 3]

Pressure tuple:

$$u = p/4 + dU_x^2 + dU_y^2 + 2 \cdot dU_y/dU_x - (dU_x + dV_y) + f(t,x,y)/(\Delta x \cdot \Delta y) \qquad (3\text{-}1)$$

x component:

$$u_{t+1} = u_t + [\nu \cdot (r(u) - 4u) - dP_x - u \cdot dU_x - v \cdot dU_y + f_x(t,x)] \cdot \Delta t \qquad (3\text{-}2)$$

y component:

$$v_{t+1} = v_t + [\nu \cdot (r(v) - 4v) - dP_y - u \cdot dV_x - v \cdot dU_y + f_y(t,y)] \cdot \Delta t \qquad (3\text{-}3)$$

where, $r(u) = u(x + \Delta x, y) + u(x - \Delta x, y) + u(x, y + \Delta y) + u(x, y - \Delta y)$, $dU_x = (u_{i+1} - u_{i-1})/(2\Delta x)$, $dU_y = (u_{j+1} - u_{j-1})/(2\Delta y)$, $\Delta x = \Delta y = 1$, $\Delta t$ is a time of a frame interval and the like.

The expression (1-1) in the Formula 1 is the two-dimensional Navier-Stokes equation, to which a condition of no smoke gathered is imposed by the expression (1-2). In the formula 1, w is a velocity vector, ν is a coefficient of viscosity, p is a pressure and f is an external force.

The expression (1-1) is divided into x and y components as shown in the formula 2.

Generally, the Navier-Stokes equation is a nonlinear partial differential equation, and it is difficult to specifically obtain a general solution with the equation. Thus, the Navier-Stokes equation is made into a difference equation by being discretized in the time direction and integrated to obtain the solution.

The formula 2 made in the difference equation is shown as (3-2) and (3-3) in the formula 3. The expression (3-1) represents a pressure tuple in the expression (3-2), which represents the x component of a velocity vector, and the expression (3-3), which represents the y component.

Selection of initial conditions is important in solving the differentiated Navier-Stokes equation. Wrong selection of the initial condition may cause a big gap between the pictures covered with smoke obtained one after another and the next I-picture. Thus, the initial conditions are set as shown in FIG. 5, for example.

Figure 5:
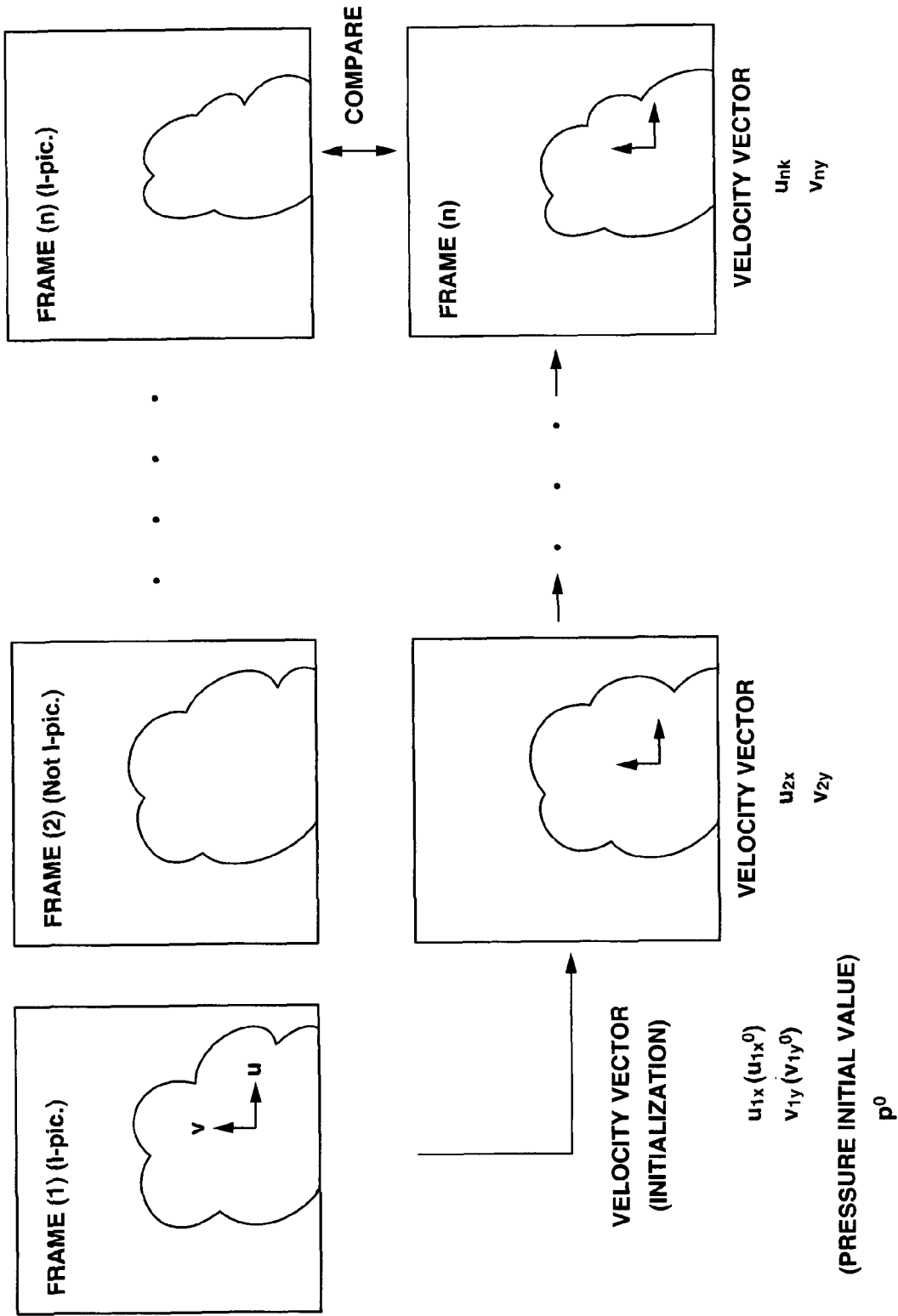
FIG. 5 is a diagram illustrating operations of generating an original picture in a particular region by simulation.

FIG. 5 shows in the upper parts frames (actually coded frames) input into the image-decoding apparatus 31 in order, and in the lower part, predicted particular pictures of smoke generated by simulation. In the lower parts of the FIG. 5, a part of the predicted particular picture is generated and shown as corresponding with the upper part frame (1).

The left-most frame in FIG. 5 is the first I-picture frame. The initial conditions are set to the smoke picture part of the frame.

The initial conditions include four conditions, that is, a velocity vector, a pressure, an external vector and a coefficient of viscosity for each particle of smoke. The coefficient of viscosity is constant through the entire frames. First, appropriate initial conditions are given to each particle of smoke in the first I-picture frame (1). FIG. 5 shows a case where the velocity vectors $u_{1x}$, $v_{1y}$ and initial values of the pressure $pu_{1x}^O$, $v_{1y}^O$, $p^O$ are set.

Then, the predicted particular pictures of smoke in the frame (n) corresponding to the next I-picture frame (n) are to be chronologically generated in an order of a predicted particular picture corresponding to the next frame (2), then a predicted particular picture corresponding to the next frame (3) and so on.

In FIG. 5, the velocity vectors $u_{1x}$, $v_{1y}$ changes like $u_{2x}$, $v_{2y}$, $U_{nx}$, $v_{ny}$ in the predicted particular pictures in the frame (2) and in the predicted particular pictures in the frame (n) corresponding to the frame (n) of the I-picture, respectively.

When the predicted particular picture of smoke (or a simulation picture) is generated to the frame (n) shown in the lower part of the right-most of FIG. 5, the predicted particular picture of smoke is compared with the actual smoke in the actual I-picture frame (n) shown above.

The comparison is specifically performed in a manner of obtaining the sum of squares of the absolute values of differences of the corresponding pixel values in the picture region of the smoke.

Here, the pixel values are a brightness value and a color difference value. It is possible to compare for only the brightness value or for both of the brightness value and the color difference value.

In such a manner, sets of predicted particular pictures are generated for smoke by changing the initial conditions. The initial conditions at the moment when the sum of squares of absolute values of the differences of pixel values from the picture region of smoke of the next I-picture is the smallest is selected as the optimal initial conditions of the original I-picture.

It is also possible to select the optimal velocity vector and pressure of each particle of smoke by perturbing (finely changing) the initial conditions of each particle and comparing the initial conditions with the picture region of smoke of the next I-picture, and correct the prior several frame (by inversely solving the difference equation, i.e., differentiating it) as required.

As the external force working on each particle of smoke in each frame cannot be obtained by solving the Navier-Stokes equation from the initial conditions, the optimal external force may be selected by perturbing the external force for each particle of each frame.

Specifically, 'fix one of the initial conditions of the velocity vector and pressure of a particle of some of the I-picture, perturb the external vectors of smoke particles of frames up to the next I-picture, and decide the external vector of each particle of each frame so that the difference from the next I-picture is optimized.' is performed each time when an optimal external force is searched for with the initial conditions of the other velocity vector and the like so that the difference from the next I-picture is optimized. In such a manner, a natural flow of smoke can be realized.

When the predicted particular picture of smoke that optimizes the difference from the I-picture can be generated, a reproduced picture whose particular region is decoded with a particular picture is generated by embedding each of the chronologically generated predicted particular pictures in a predetermined region in a frame that has the closest relationship with each of the predicted particular picture.

FIG. 6 outlines operations of the image-decoding method by the image-decoding apparatus 31 according to the present embodiment.

At the first step S11, the variable-length decoding circuit 34 determines whether or not the input stream signal (coded picture) is the I-picture. If it is the I-picture, the intra-decoding (intra-frame decoding) is performed on it by the first image-decoding apparatus 32, as shown in step S12.

The decoded I-picture is stored in the frame memory 40. The second image-decoding apparatus 33 generates the predicted particular picture (simulation picture) corresponding to the original picture of the particular region other than the I-picture by using the pictures in the particular region as shown at step 13.

On the other hand, if it is not the I-picture, the first image-decoding unit 32 decodes the picture other than the particular region by the interframe decoding as shown at step S14. Then at step S15, the reproduced picture is generated as the pictures generated at step S13 and step S14 are composed.

In the method of decoding an image shown in FIG. 6, the particular region of the frames other than the I-picture is coded with the amount of coding smaller than that of the original picture. Thus, the method enables to decode an image coded with a small amount of coding.

Now, the operations of generating the predicted particular picture (simulation picture) described in FIG. 5 will be described with reference to FIG. 7.

Figure 7:
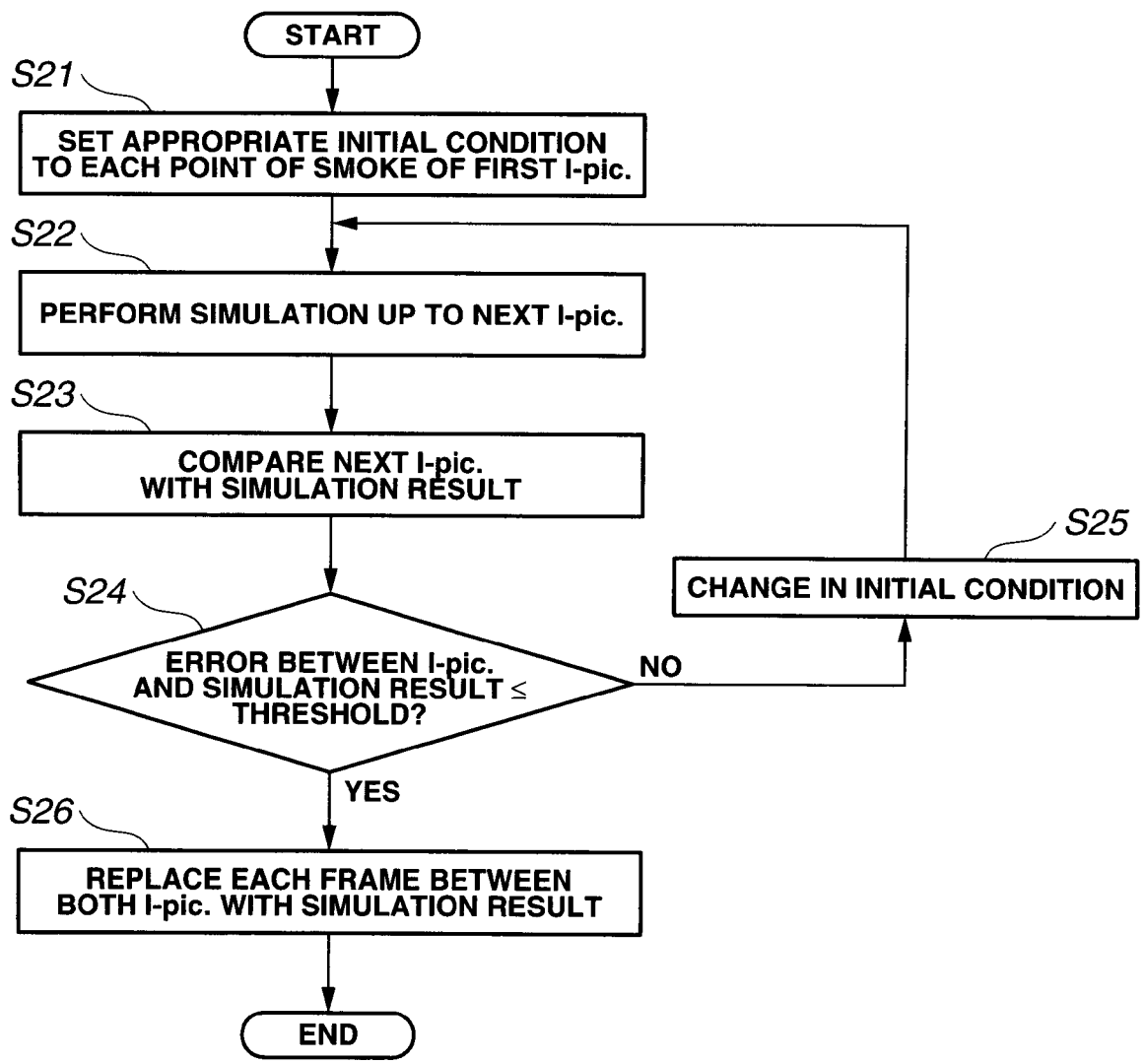
FIG. 7 is a flowchart showing operations of a second image-decoding unit in the image decoding apparatus according to the second embodiment.

FIG. 7 is a flowchart showing operations for the second image-decoding unit 33 to perform the processing described in FIG. 5. In FIG. 7, a case where a particular picture is smoke is described similarly as in FIG. 5. At the first step S21, the predicted particular picture generating circuit 41 sets appropriate initial conditions at each point in a picture region of smoke in the first I-picture.

Then at step S22, a CPU, for example, which forms the simulation picture generating circuit 41a in the predicted particular picture generating circuit 41, performs the above-mentioned simulation until the next I-picture is reached.

At the next step S23, the CPU compares the simulation picture with a predicted particular picture of smoke corresponding to the smoke of the next I-picture obtained by the simulation.

At the next step S24, the CPU determines whether or not the compared result is at the threshold or less. If the result is not the threshold or less, the CPU changes the initial conditions set at step S25 and returns to step S22.

If the compared result is the threshold or less at the determination processing at step S24, the operation proceeds to step S26.

At step S26, the particular picture composing circuit 42 replaces the particular region in a frame between both of the I-pictures with the simulated result. Then, the processing ends.

In such a manner, the present embodiment can generate the original picture of smoke or the like even in the (inter) frame other than the I-picture from the picture coding signal as a stream signal with the small amount of coding.

According to the present embodiment, decoding can be performed from an image (coded) with small amount of coding.

Also the present embodiment has an effect of reducing the transmission quantity of coded image information to be transmitted from the image coding apparatus side.

The original picture of the particular region may be used in generating the simulation picture. Alternatively, a particular picture as a picture that can be sufficiently approximated to the original picture may be used in generating a simulation picture.

Third Embodiment

Now, the third embodiment of the present invention will be described. The second embodiment is applied with the processing for performing replacement or the like on the particular region part in the frame to be subjected to the interframe coding with the simulation picture generated from the particular picture of the I-picture by simulation when image decoding is performed on the coded picture.

In the present embodiment, the simulation picture is generated by simulation when coding is performed. In such a case, the simulation picture is compared with an actual particular picture such as smoke (original picture) when the coding is performed, and the information for generating the simulation picture and the actual particular picture are coded according to the compared result.

Figure 8:
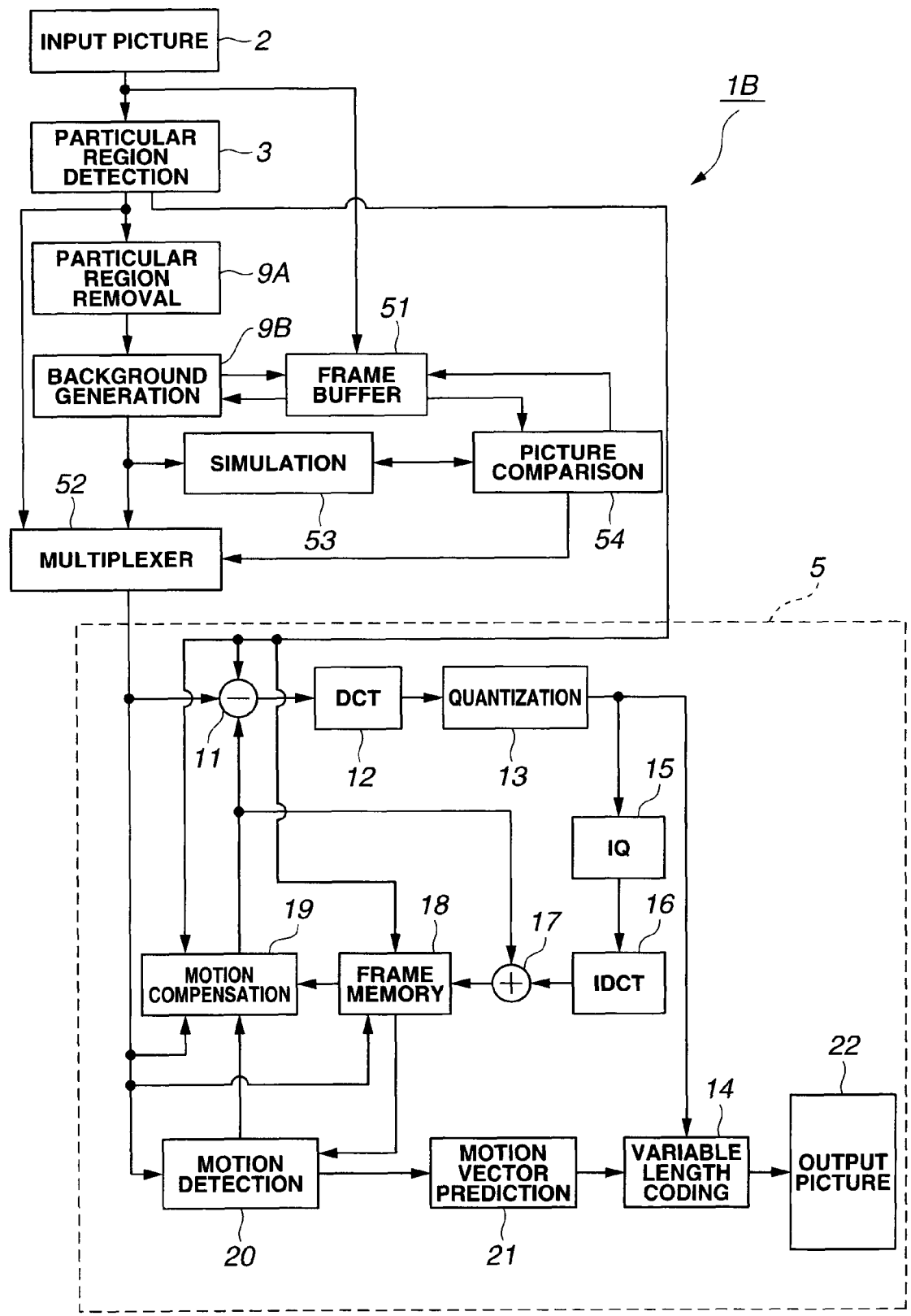
FIG. 8 is a block diagram showing a configuration of an image coding apparatus according to a third embodiment of the present invention.

FIG. 8 shows a configuration of the image coding apparatus 1B according to the third embodiment of the present invention. The input picture 2 is input into the particular region detecting unit 3 shown in FIG. 1. The particular region detecting unit 3 detects the presence or absence of the particular region in the input picture. If the particular region is present, the particular-detecting unit 3 detects the particular region.

The output in the case where the particular region detecting unit 3 detected the particular region is input into a particular region removing unit 9A and also into a first input terminal of the multiplexer 52.

The particular region removing circuit 9A removes the particular region detected by the particular region detecting unit 3 and outputs it to a background generating circuit 9B.

The background generating circuit 9B removes the particular region from the input picture 2, replaces the particular region with a picture such as a background picture or the like, generates the background composed picture and outputs it to the frame buffer 51, and also outputs it to the simulating circuit 53.

The input picture 2 is also input into the frame buffer 51. Then, the frame buffer 51 outputs the input picture 2 of the particular region part, which is the input picture with the region other than the particular region replaced with the background picture or the like subtracted, into the picture comparing circuit 54.

For the I-picture frame, the particular region removing circuit 9A outputs the input picture 2 to the simulating circuit 53 and a multiplexer 52 through the background generating circuit 9B without removing the particular region from the input picture 2. The information on the particular region is also input into the simulating circuit 53.

The simulating circuit 53 performs simulation on the picture part such as the part covered with smoke in the particular region from the I-picture frame, generates the simulation picture corresponding to the particular region in each frame other than the I-picture, and outputs it to a picture comparing circuit 54.

The simulating circuit 53 codes the information for generating the simulation picture (the initial conditions and the like described in the second embodiment) and outputs it to the other side of input terminal of the multiplexer 52.

The picture comparing circuit 54 compares the simulation picture output from the simulating circuit 53 with the actual particular picture part such as the part covered with smoke or the like output from the frame buffer 51, and controls switching (selection) of the multiplexer 52 according to the compared result.

For example, the picture comparing circuit 54 performs picture comparison whether or not the simulation picture is the picture that can approximate the actual particular picture (original picture) by comparing the threshold with the sum of squares of differences of each pixel value and corresponding pixel value between the simulation picture and the corresponding particular picture part to see if the sum exceeds the threshold or not.

The compared result showing that the sum exceeds the threshold means that the simulation picture is not so much approximated as to allow the original picture. The compared result showing that the sum is within the threshold means that the simulation picture is so much approximated as to allow the original picture.

As a result, if the compared result shows that the sum exceeds the threshold, the picture comparing circuit 54 controls the switching so that the input picture 2 is output from the multiplexer 52 to the picture coding unit 5.

If the compared result shows that the sum exceeds the threshold, the picture comparing circuit 54 may return the result to the simulating circuit 53 to cause simulation to be performed under further different initial conditions.

In contrast, if the compared result shows that the sum is the threshold or less, the picture comparing circuit 54 controls the switching of the multiplexer 52 so that the information for generating the simulation picture (more specifically, setting values and the like of the calculated initial conditions) added to the background composed picture is output to the picture coding unit 5.

Therefore, if a gap between the simulation picture and the particular picture part exceeding the threshold is detected, the picture coding unit 5 performs usual picture coding on the input picture 2 that actually includes smoke or the like. In contrast, if the gap is the threshold or less, the picture coding unit 5 performs coding on the information for generating the background composed picture whose particular region is replaced and the simulation picture.

As the picture part, in which the particular region is replaced with the picture such as the background picture to be described later, is replaced with the simulation picture when the image decoding (picture decoding) is performed at the image decoding apparatus side, the picture part may be set to a particular picture with the small amount of coding, for example with a predetermined amount of coding Qe or less, as a picture (of the background picture) to replace the particular region.

If the particular region detecting unit 3 does not detect the particular region, the input picture 2 is input into the subtractor 11, the frame memory 18, the motion compensating circuit 19, and the motion detecting circuit 20 all included in the picture coding unit 5. The picture coding unit 5 performs usual picture coding.

The output signal from the multiplexer 52 is input into the subtractor 11, the frame memory 18, the motion compensating circuit 19, and the motion detecting circuit 20 in the picture coding unit 5. As other configuration of the picture coding unit 5 shown in FIG. 8 has been described in FIG. 1, so that the description thereof is omitted here.

Figure 9:
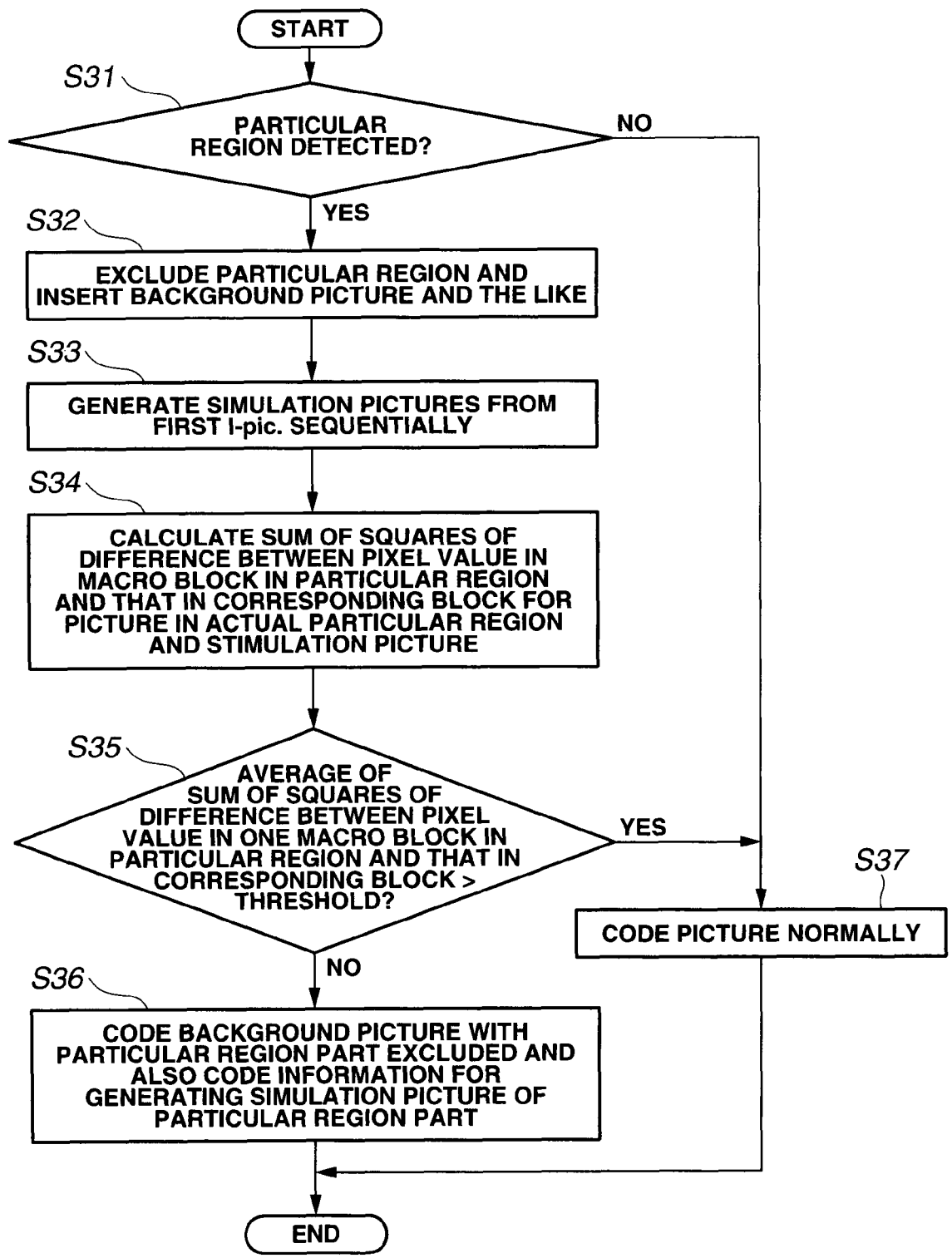
FIG. 9 is a flowchart showing operations of the image coding apparatus according to the third embodiment.

The image coding apparatus 1B according to the present embodiment performs, for example, the operation as shown in FIG. 9.

At the first step S31, the particular region detecting unit 3 detects whether or not the input picture 2 includes the particular picture such as a picture covered with smoke or the like.

If no particular region is detected, the operation proceeds to step S37, where the input picture 2 is coded in the usual method. That is, if no particular region is detected, coding is performed by the picture coding unit 5 as in the existing method.

In contrast, if the particular region is detected, the operation proceeds to step S32. If it is other than the I-picture, the particular region removing circuit 51 removes the particular region from the input picture 2, and the background generating circuit 9B generates the background composed picture by inserting a background picture or the like there. For the I-picture, the frame and the information on the particular region in such a case are input in the simulating circuit 53.

At the next step S33, the simulating circuit 53 sets the initial conditions to the picture in the particular region in the first I-picture, and sequentially generates the simulation pictures corresponding to the respective frames when the next I-picture is reached as described with reference to the second embodiment. Then at the next step S34, with respect to the picture having the particular region in each of the actual input frame and the simulation picture, the picture comparing circuit 54 calculates the sum of squares of differences between the pixel value for example in Macro Block of the particular region and the pixel value in a block corresponding to the Macro Block.

Then, at the next step S35, the picture comparing circuit 54 compares (determines) whether or not the average value of the sum of squares of differences between the pixel value in one Macro Block and that in the corresponding block exceeds the threshold.

For the frame of the picture, for which the compared result shows that the average value exceeds the threshold, the usual picture coding is performed on the frame by the picture coding unit 5 as shown at step S37 as in the existing method. That is, the frame is subjected to the picture coding as including the original picture such as the picture of smoke or the like also in the frame other than the I-picture. In such a case, if the average value exceeds the threshold, the same processing may be repeated with different initial conditions.

If the average value is the threshold or less with the different initial conditions, the operation proceeds to step S36. If the average value exceeds the threshold even with the same processing performed for the set number of times with different conditions, the operation may proceed to step S37.

On the other hand as for the frame, for which the compared result shows that the average value does not exceed the threshold, the background picture part in the frame with the particular region removed is coded by the picture coding unit 5 as the existing method. In such a case, the information for generating the simulation picture is coded for the particular region part by the picture coding unit 5.

If the simulation picture is correctly generated by simulation as a result of such processing, the amount of coding can be reduced when the information is coded smaller than that of the conventional case. That is, the amount of coding can be reduced.

If the particular region with a big amount of motion or the like such as smoke is present, the image coding apparatus 1B according to the present embodiment can determine whether or not the simulation picture generated as the original picture of the particular region is simulated appropriately represents the original picture by comparing the picture with the original picture (compared result can be obtained).

The compared result can be obtained for each frame (for a short time interval), for example. Therefore, that facilitates the simulation more appropriately.

With the information generated by simulation, the image decoding at the side of the image decoding apparatus 31B to be described below can be performed with less processing.

Figure 10:
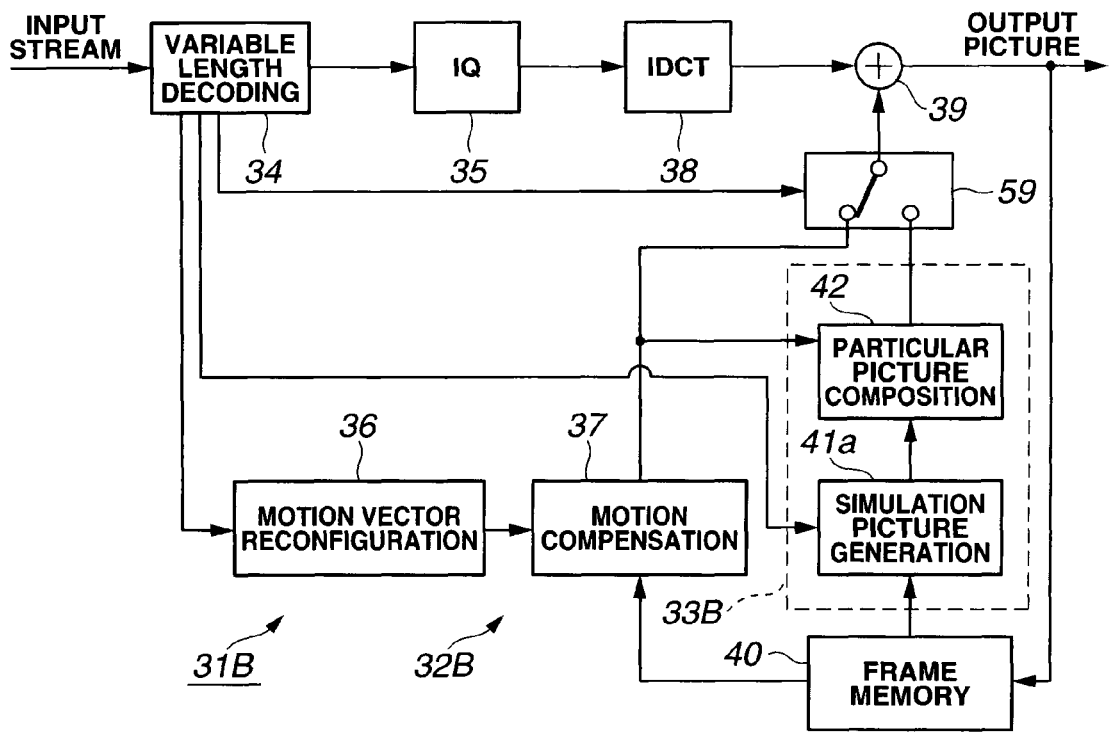
FIG. 10 is a block diagram showing a configuration of the image decoding apparatus according to the third embodiment of the present invention.

FIG. 10 shows a configuration of the image decoding apparatus 31B corresponding to the image coding apparatus 1B according to the third embodiment.

The image decoding apparatus 31B uses the first image decoding unit 32B provided with a multiplexer 59 and the second image decoding unit 33B with the predicted particular picture generating circuit 41 as the simulation picture generating circuit 41a as switching means (selecting means) for switching the signal input to the adder 39 in the image decoding apparatus 31 in FIG. 4.

The multiplexer 59 usually selects to input the predicted picture output from the motion compensating circuit 37 into the adder 39. The multiplexer 59 detects whether or not the output signal from the variable-length decoding circuit 34 includes the information for generating the simulation picture. If the information is included, the multiplexer 59 switches to input the output from the second image decoding unit 33B to the adder 39.

The information for generating the simulation picture is input into the simulation picture generating circuit 41a, where the simulation picture is generated by the simulating circuit 53 shown in FIG. 8 with the information.

Then, the particular picture composing circuit 42 and the adder 39 perform composing processing on the simulation picture such as to embed the picture into the particular region part to generate the reproduced picture. In FIG. 10, the predicted picture from the motion compensating circuit 37 is input for the block part, in which the simulation picture and the background picture around the simulation picture are coexistent, in the particular picture composing circuit 42, so that the particular picture composing circuit 42 composes both of the pictures.

Figure 11:
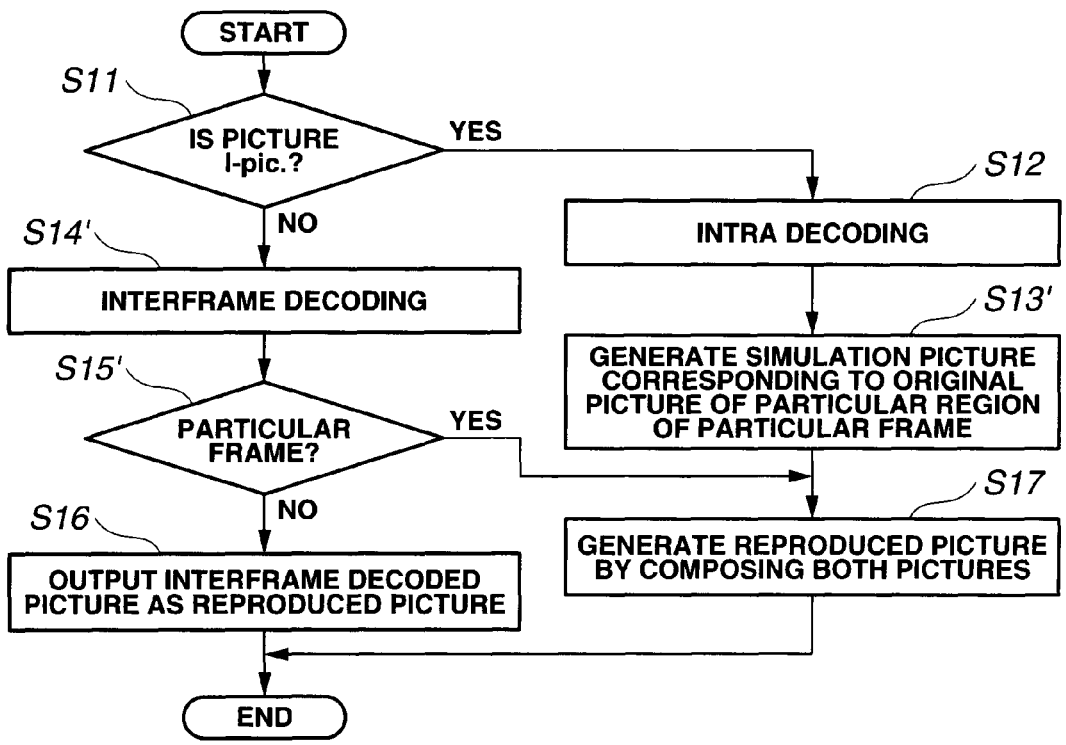
FIG. 11 is a flowchart showing operations of image decoding by the image decoding apparatus shown in FIG. 10.

FIG. 11 is a flowchart of outlined operations of an image decoding method by the image decoding apparatus 31B shown in FIG. 10. FIG. 11 is same as FIG. 6 except for the processing after step S13. Only those different from FIG. 6 will be described.

At step S13' after step S12, a simulation picture corresponding to the original picture of the particular region in the particular frame in the frame other than the I-picture is generated in the image decoding apparatus 31B. The particular frame means the frame with the information for generating the simulation picture in the frame other than the I-picture added.

If it is determined that the picture is not the I-picture at step S11, the apparatus generates the picture decoded by the usual interframe decoding as shown at step S14'. In such a case, both the picture with the particular region replaced and the coded picture with the particular region not replaced are included.

Then, the picture generated at step S14' is subjected to determination on whether or not it is the particular frame at step S15'. If it is determined that it is not the particular frame, the operation proceeds to step S116, where the picture generated at step S14' is output as a reproduced picture. The processing at step S16 corresponds to the processing to generate the reproduced picture by adding the predicted picture from the motion compensating circuit 37 passed through the multiplexer 59 added at the adder 39 in FIG. 10.

If it is determined as the particular frame at step S15', at step S117, a reproduced picture is generated by composition of replacing the particular region part in the picture generated at S14' with the simulation picture generated at step S13'.

Even if a particular region with the big amount of motion such as a particular region with smoke is included in the coded picture to be input, the image decoding apparatus 31B according to the present embodiment can effectively generate the reproduced picture decoded with a small amount of processing by using the (previously calculated) information for generating the original picture of the particular region by simulation, as the information is added.

Although the formula 2 is simplified to the two-dimensional equation as an example of generating a simulation picture by simulation, the formula 2 may be treated as the three dimensional equation so that the result is projected on the two-dimensional plane. Although the case of simulation by which the Navier-Stokes equation is applied to smoke is described in the example shown above, the simulation may be applied to flare or the other particular pictures. For example, such simulation using the Monte Carlo method may be used.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image coding apparatus comprising:
a particular region detecting unit configured to detect from an input picture a particular region including a particular picture, the particular region being detected as a region within the input picture which has a hue within a predetermined range corresponding to an average hue of the particular picture and which has an amount of movement between different frames which is equal to or larger than a threshold;
a simulation picture generating unit configured to generate a simulation part picture of the particular region of subsequent frames based on a simulation by solving a discrete difference equation using initial conditions set thereto, the simulation picture generating unit being configured to obtain the initial conditions such that a difference between the generated simulation part picture and the picture of the particular region detected by the particular region detecting unit is smallest; and
a coding unit configured to generate a coded stream by performing coding processing that is intra-frame coding or interframe coding on the input picture and to perform, with respect to the particular region, processing of embedding the initial conditions obtained by the simulation picture generating unit into the coded stream, instead of performing the interframe coding.

2. The image coding apparatus according to claim 1, further comprising a picture comparing unit configured to perform comparison on whether or not the simulation part picture approximates the picture in the particular region.

3. The image coding apparatus according to claim 1, wherein if a compared result shows that the simulation part picture approximates the picture in the particular region, the particular region is replaced with a predetermined picture.

4. The image coding apparatus according to claim 1, wherein if a compared result shows that the simulation part picture does not approximate the picture in the particular region, the coding unit performs the interframe coding on the particular region.

5. An image decoding apparatus comprising:
a decoding unit configured to receive an input of a coded stream,
the coded stream being generated by i) detecting from an input picture a particular region including a particular picture, the particular region being detected as a region within the input picture which has a hue within a predetermined range corresponding to an average hue of the particular picture and which has an amount of movement between different frames which is equal to or larger than a threshold, ii) generating a simulation part picture of the particular region of subsequent frames based on a simulation by solving a discrete difference equation using initial conditions set thereto, the initial conditions being obtained such that a difference between the generated simulation part picture and the picture of the detected particular region is smallest, and iii) performing by coding processing that is intra-frame coding or interframe coding on the input picture and performing, with respect to the particular region, processing of embedding the obtained initial conditions into the coded stream, instead of performing the interframe coding; and
the decoding unit being configured to perform the intra-frame decoding or the interframe decoding of the coded stream except the initial conditions embedded into the coded stream and to extract the initial conditions from the coded stream; and
a simulation picture generating unit configured to generate a simulation part picture by setting the initial conditions extracted by the decoding unit to the discrete difference equation and solving the discrete difference equation using the set initial conditions, and combining the generated simulation part picture with the picture obtained by performing the intra-frame coding or the interframe coding.

6. The image decoding apparatus according to claim 5, wherein the simulation picture generating unit generates the simulation part picture by using the Navier-Stokes equation for coding initial conditions independent of a repeating step and number repetitions.

7. An image decoding method comprising:
receiving an input of a coded stream,
the coded stream being generated by i) detecting from an input picture a particular region including a particular picture, the particular region being detected as a region within the input picture which has a hue within a predetermined range corresponding to an average hue of the particular picture and which has an amount of movement between different frames which is equal to or larger than a threshold, ii) generating a simulation part picture of the particular region of subsequent frames based on a simulation by solving a discrete difference equation using initial conditions set thereto, the initial conditions being obtained such that a difference between the generated simulation picture and the picture of the detected particular region is the smallest, and iii) performing coding processing that is intra-frame coding or interframe coding on the input picture and performing, with respect to the particular region, processing of embedding the obtained initial conditions into the coded stream, instead of performing the interframe coding;

performing the intra-frame decoding or the interframe decoding of the coded stream except the initial conditions embedded into the coded stream, and extracting the initial conditions from the coded stream; and generating a simulation part picture by setting the initial conditions extracted by the decoding unit to the discrete difference equation and solving the discrete difference equation using the set initial conditions, and combining the generated simulation part picture with the picture obtained by performing the intra-frame coding or the interframe coding.

8. The image decoding method according to claim 7, wherein the simulation part picture is generated by using the Navier-Stokes equation for coding initial conditions independent of a repeating step and number of repetitions.

* * * * *